United States Patent

Suzuki

[15] 3,688,054

[45] Aug. 29, 1972

[54] VIBRATO EFFECT PRODUCING APPARATUS USING RECIPROCATING DISPLACEMENT OF BOTH RECORD AND PLAYBACK HEADS

[72] Inventor: Akihisa Suzuki, Shizuoka-ken, Japan

[73] Assignee: Nippon Gakki Seizo Kabushiki Kaisha, Shizuoka-ken, Japan

[22] Filed: Sept. 2, 1970

[21] Appl. No.: 68,950

[30] Foreign Application Priority Data

| | | |
|---|---|---|
| Sept. 3, 1969 | Japan | 44/83720 |
| Sept. 3, 1969 | Japan | 44/83721 |
| Sept. 26, 1969 | Japan | 44/91729 |
| Sept. 26, 1969 | Japan | 44/91730 |
| Sept. 26, 1969 | Japan | 44/91731 |
| Sept. 26, 1969 | Japan | 44/91732 |
| Nov. 8, 1969 | Japan | 44/106288 |
| Nov. 8, 1969 | Japan | 44/106289 |
| Nov. 8, 1969 | Japan | 44/106290 |

[52] U.S. Cl. ...........179/100.2 RE, 84/1.25, 318/282

[51] Int. Cl......G11b 31/00, G11b 21/02, G10h 1/04

[58] Field of Search ..............179/100.2 RE; 84/1.25

[56] References Cited

UNITED STATES PATENTS

| | | | |
|---|---|---|---|
| 2,512,015 | 6/1950 | Graveel | 84/1.25 |
| 3,518,354 | 6/1970 | Lubow | 84/1.25 |
| 3,484,563 | 12/1969 | Tak | 179/100.2 RE |
| 3,576,406 | 4/1971 | Court et al. | 179/100.2 RE |

FOREIGN PATENTS OR APPLICATIONS

| | | | |
|---|---|---|---|
| 1,126,633 | 3/1962 | Germany | 179/100.2 RE |

*Primary Examiner*—Bernard Konick
*Assistant Examiner*—Robert S. Tupper
*Attorney*—Cushman, Darby & Cushman

[57] ABSTRACT

A vibrato effect producing apparatus in which there are provided a running means for producing a relative motion between a magnetic recording medium, such as a magnetic tape, and tone signal recording head and reproducing head, and means for providing periodical deviation of the instantaneous speed of the recording medium relative to the reproducing head from the instantaneous speed of the recording medium realtive to the recording head, while keeping the average value of the both speeds equal, so that a frequency modulated signal may be derived at the reproducing head.

6 Claims, 21 Drawing Figures

INVENTOR.
Akihisa Suzuki
BY
Cushman, Darby & Cushman
ATTORNEYS

INVENTOR
Akihisa Suzuki
BY
Cushman, Darby & Cushman
ATTORNEYS

INVENTOR
Akihisa Suzuki

BY
Cushman, Darby & Cushman
ATTORNEYS

INVENTOR
Akihisa Suzuki
BY
Cushman, Darby & Cushman
ATTORNEYS

INVENTOR.
Akihisa Suzuki

BY

Cushman, Darby & Cushman
ATTORNEYS

INVENTOR.
Akihisa Suzuki
BY
Cushman, Darby & Cushman
ATTORNEYS

VIBRATO EFFECT PRODUCING APPARATUS USING RECIPROCATING DISPLACEMENT OF BOTH RECORD AND PLAYBACK HEADS

BACKGROUND OF THE INVENTION

1. Field of the Invention

The present invention relates to a vibrato effect producing apparatus and more particularly to apparatus for providing vibrato effects to electrical signals when the signals are covered to audible sounds in an electronic or electric musical instrument, utilizing a recording and reproducing mechanism.

2. Description of the Prior Art

Heretofore, there has been used an oscillator constituting a tone source circuit of an electronic musical instrument, in which it is capable of providing vibrato effects, i.e. capable of being subjected to frequency modulation, in order to provide emotional depth and warmness of tones generated from the instrument. However, the oscillator of this type is disadvantageous in that it is lower in frequency stability and is more complicated in construction than those of the conventional type.

SUMMARY OF THE INVENTION

It is, therefore, an object of the present invention to provide a vibrato effect producing apparatus capable of providing specific sound effects by electrically processing sound signals to produce fluctuation therein.

Another object of the present invention is to provide a vibrato effect producing apparatus having a novel structure utilizing magnetic recording and reproducing means.

A further object of the present invention is to provide a vibrato effect producing apparatus which can effect frequency modulation with high frequency stability and which is relatively simple in construction.

A further object of the present invention is to provide a novel drive mechanism for use with a magnetic recording and reproducing means to cause tone signals to be frequency modulated.

According to the present invention, there is provided a vibrato effect producing apparatus comprising means for receiving an input tone signal, a magnetic recording medium such as a magnetic tape, means for running said magnetic recording medium, a tone signal recording head, a reproducing head, means for providing periodical deviation of the instantaneous speed of the recording medium relative to the reproducing head from the instantaneous speed of the recording medium relative to the recording head, while keeping the average value of the both speeds equal, and output means for deriving a frequency modulated tone signal from the reproducing head.

Other objects, features and advantage of the present invention will become apparent from the following detailed description when taken in conjunction with the accompanying drawings.

BRIEF DESCRIPTION OF THE DRAWINGS

In the drawings, like reference numerals and symbols indicate like parts.

DESCRIPTION OF THE PREFERRED EMBODIMENTS

Figure 1:
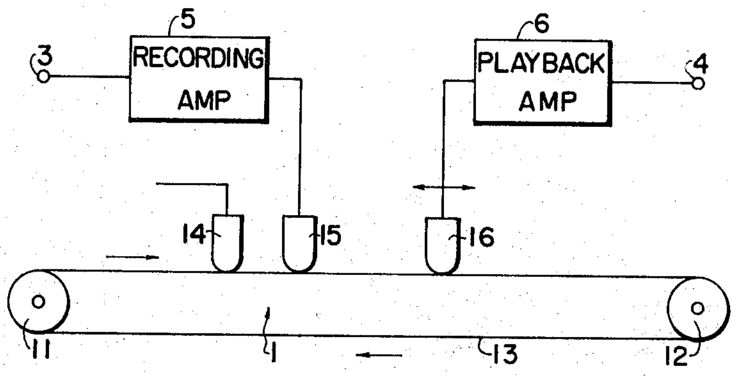
FIG. 1 is a structural view of a vibrato effect producing apparatus according to an embodiment of the present invention.
Figure 2:
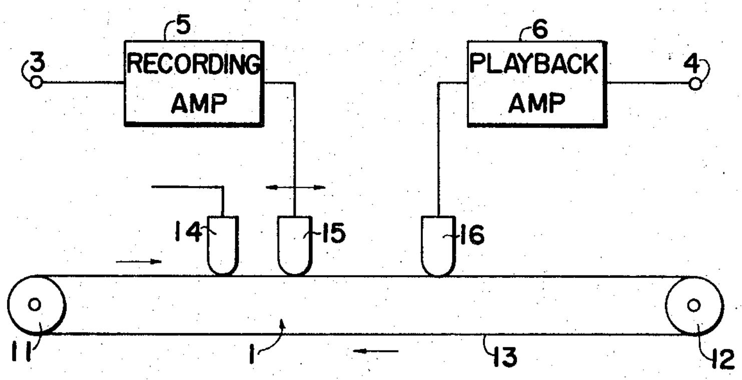
FIG. 2 is a view showing another embodiment of the present invention.
Figure 3:
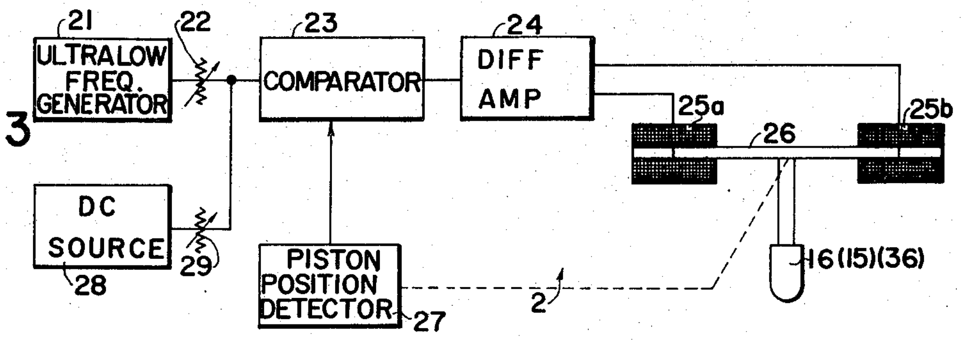
FIG. 3 is a view of a drive mechanism for causing a displacement of a recording head or a reproducing head.

Generally, the apparatus according to a preferred embodiment of the present invention is constituted principally by a recording and reproducing mechanism 1 as shown in FIG. 1 or 2 and a drive mechanism 2 for causing a displacement of a recording head and/or a reproducing head as shown in FIG. 3.

Referring now to FIGS. 1 to 4, the recording and reproducing mechanism 1 is arranged to be directly or selectively connected by the operator between an output terminal 3 common to the entire tone generator control circuits (not shown) including tone generators, keyboard circuits and tone coloring circuits or a common output terminal 3 of integrated tone generator control circuit groups (not shown), and an input terminal 4 of an amplifier or acoustic circuit for effecting an electro-acoustic conversion.

The recording and reproducing mechanism 1 includes a plurality of driving drums 11 and 12 which can rotate at a constant speed through a known rotating means by a driving mechanism (not shown), at least one endless magnetic tape 13 carried on the drums, which may be substituted by a magazine type or a magnetic disk, an erasing head 14, a recording head 15 and a reproducing head 16. As shown in the drawings, between the recording head 15 and the output terminal 3, and between the reproducing head 16 and the input terminal 4, a recording amplifier 5 and a playback amplifier 6 may be provided, respectively.

A drive mechanism 2 serves to displace the recording head and/or the reproducing head reciprocatingly in the direction parallel to that of the tape transportation. As shown in FIG. 3, the drive mechanism 2 is so constructed that an output signal of an ultra-low frequency signal generator 21 in the order of 0.5 to 10 Hz is applied subsequently through a variable attenuator 22 and a voltage comparator circuit 23 to the input side of a differential amplifier 24 of a push-pull type, and then two signals derived from the output side of the amplifier 24 — which are opposite in phase to each other — are supplied to plunger coils 25*a* and 25*b*, respectively.

The plunger coil assembly 25 is disposed at an appropriate distance from the mechanism 1. Thus, a magnetic force induced alternately from two coils causes a piston 26 — formed of magnetic material and loosely engaged into the coils — to be moved linearly and reciprocatingly. Further, in order to improve the linearity of the piston motion and to restore the displaced piston to the initial position, there is provided a piston position detecting device 27 between said comparator circuit 23 and the piston 26 to automatically control the operation of the differential amplifier 24, and there is connected a DC source 28 through a variable resistor or attenuator 29 to one input of the comparator circuit 23 for effecting a fine adjustment of the center point of the piston position within a certain range by varying the DC level of the comparator circuit 23. The piston 26 is mounted on the reproducing head 16 or the recording head 15 by the use of an appropriate means and is caused to displace linearly in a direction parallel to that of the travelling medium such as the magnetic tape 13.

Now, the operation of the apparatus shown in the above-mentioned embodiments will be described.

Assuming that the travelling velocity or running speed of the recording medium such as the magnetic tape is $v$ centimeters per second, and that the range (amplitude) of a displacement of the recording head or the reproducing head caused by the drive mechanism 2 is $\pm x$ millimeters, the variation in the relative velocity between the magnetic tape and the head being actuated, i.e. the range velocity $\dot{x}$, can be expressed by:

$$\dot{x} = 2\pi px \text{ (millimeters per second)}$$

wherein $p$ represents the displacement frequency (Hz) of the head.

Therefore, the variation rate of the velocity can be expressed by:

$$\frac{\dot{x}}{v} = \frac{2\pi px}{v}$$

From the formula, when the reproducing head 16 or the recording head 15 is displaced at a displacement frequency of 0.5 Hz with a displacement range of 1 millimeter utilizing the ultra-low frequency signal generator 21, the variation in velocity becomes ±0.83 percent, wherein $v$ is assumed 38 centimeters per second.

Accordingly, when the oscillation frequency of the tone generator is 1,000 Hz, an input signal of such a frequency is subjected to a frequency deviation of ±8.3 Hz, and hence, the output waveform which may be derived at the input terminal 4 becomes a frequency modulated one.

Thus, when either of the heads is rendered to be reciprocatingly displaced at a relatively low frequency e.g. 0.5 to 2 Hz by the use of the ultra low frequency signal generator 21, the sound resulting from the head provides celesta or a chorus effect, while if the head is arranged so as to be reciprocatingly displaced at a relatively high frequency, e.g., 5 to 8 Hz, the sound will provide a good vibrato effect.

Therefore, by arranging the apparatus so that the operator may change the oscillation frequency of the ultra-low frequency signal generator in the range of 0.5 up to 10 Hz continuously or selectively, the operator may cause the playing sound to provide the above-mentioned effects such as chorus or vibrato at will.

Figure 4A:
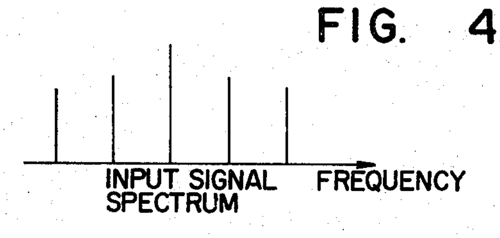
FIGS. 4*a* to 4*c* are charts for the explanation of operation of the present apparatus.

As is understood from the foregoing description if the variation in the relative speed between either of the recording head and the reproducing head and the speed of the travelling recording medium such as a magnetic tape is varied by a displacement of either of the heads, the spectrum of an output signal to that of an input signal as shown by a line spectrum in FIG. 4a becomes a distributed spectrum, resulting in the same effects as described above. The vibrato effect producing apparatus may be used in electric musical instruments such as guitar and also in electronic musical instruments such as electronic organ.

Figure 5:
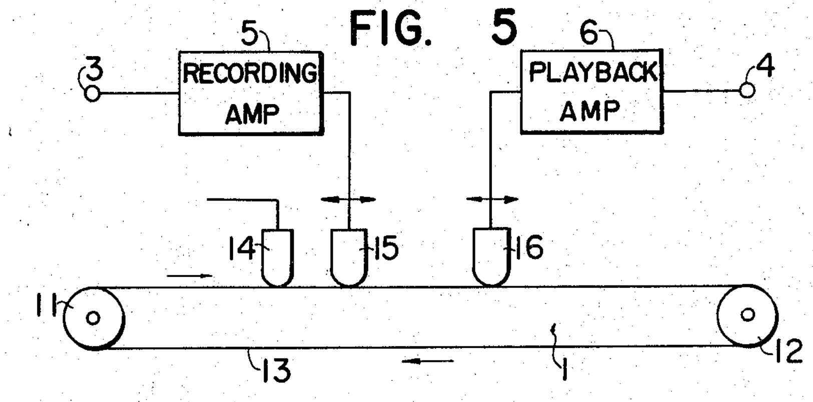
FIGS. 5 to 7 are views of showing further embodiments of the present invention, respectively.

Referring to FIG. 5, there is shown another embodiment of the present invention associated with the previous embodiment in which both of the recording head and the reproducing head are arranged to instantaneously displace at different frequencies, whose ratio may be $1/\sqrt{2}$, by respective drive mechanisms, so that much complicated vibrato effects may be obtained.

Figure 6:
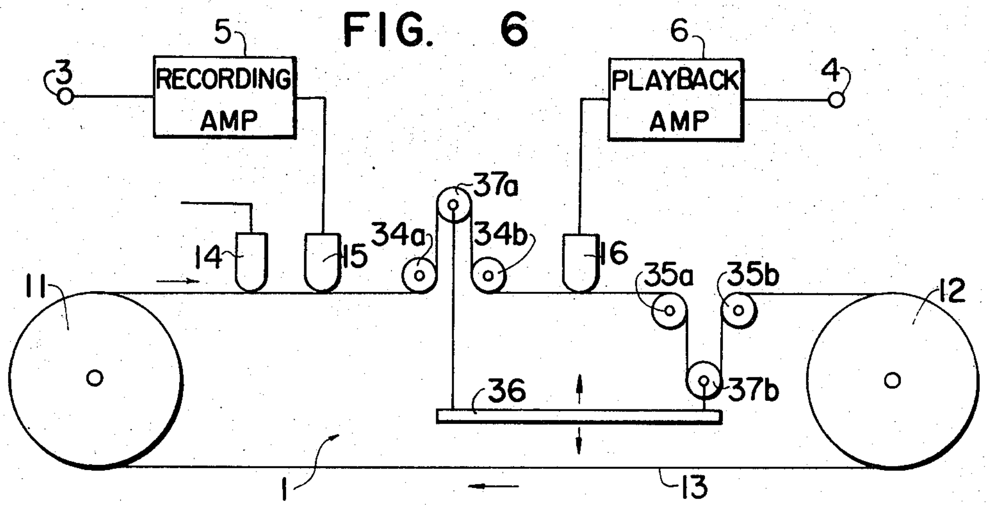

Referring to FIG. 6, there is shown another embodiment in which a part of the traveling recording medium 13 is displaced instantaneously in the reverse direction of the medium transportation in place of the displacement of the head as stated above. Numerals 34a, 34b and 35a, 35b respectively denote pairs of rolls mounted on a base with a required distance to each other for guiding the tape 13. Numerals 37a and 37b denote a pair of slidable guide rolls which are mounted on a member 36 connected with the above-mentioned drive mechanism 2 so as to instantaneously displace with the motion of the member 36. Between the driving drum 11 and the guide roll 34a, there are provided an erasing head 14 and a recording head 15. A reproducing head 16 is arranged between the guide rolls 34b and 35a. The 37*rolls 27a* and 37b are disposed between the guide rolls 34a and 34b, and between the guide rolls 35a and 35b, respectively. On the member 36 is mounted a piston 26 by an appropriate means to thereby actuate the member 36. The instantaneous displacement of the member 36 causes the speed of the tape 13— travelling on the path between rolls 34a and 35b via the guide rolls 37a and 37b — to be varied.

Figure 7:
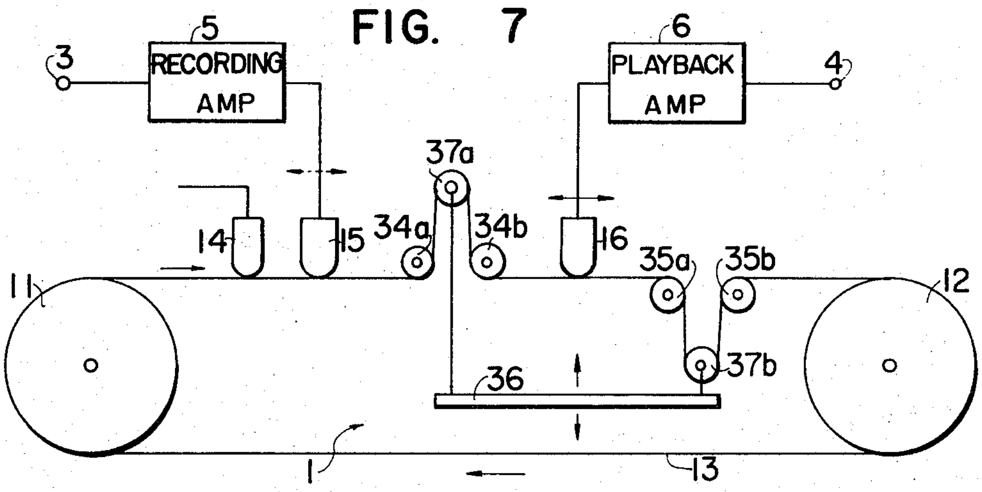

FIG. 7 shows a modification of the embodiment of FIG. 6 in which, in addition to the instantaneous displacement of a part of the recording medium, either the recording head 15 or the reproducing head 16 is simultaneously also rendered to be displaced instantaneously, utilizing a plurality of the drive mechanisms 2 at different frequencies.

Figure 4B:
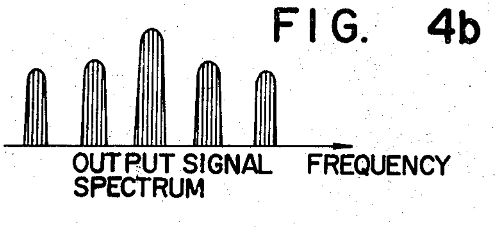
Figure 4C:
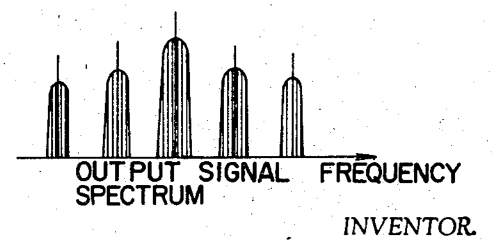
Figures 8, 9, 10:
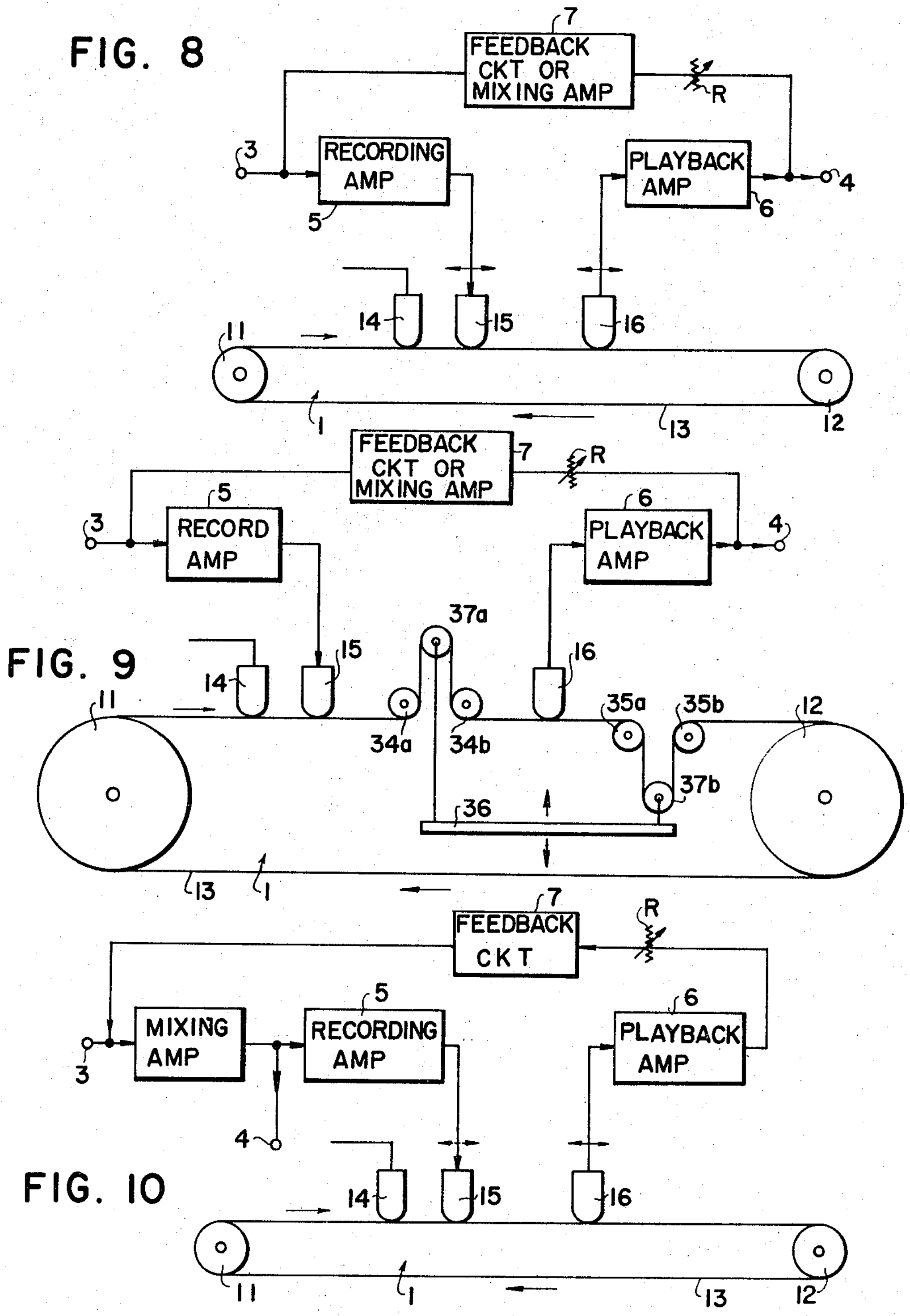
FIGS. 8 to 10 are views showing modifications of the embodiments shown in FIGS. 5 to 7.

Referring to FIGS. 8 and 9 there are shown modifications of FIGS. 5 and 6, respectively, in which there is provided a feedback circuit 7 or a mixing amplifier through a resistive attenuator R between the output terminal 3 and the input terminal 4 for providing an echo effect or a tremolo effect in addition to a vibrato effect. In FIG. 10, a mixing circuit is provided in addition to the feedback circuit 7 in FIG. 8, so that the tone input signal may directly be derived to provide the output spectrum as shown in FIG. 4c.

Figure 11:
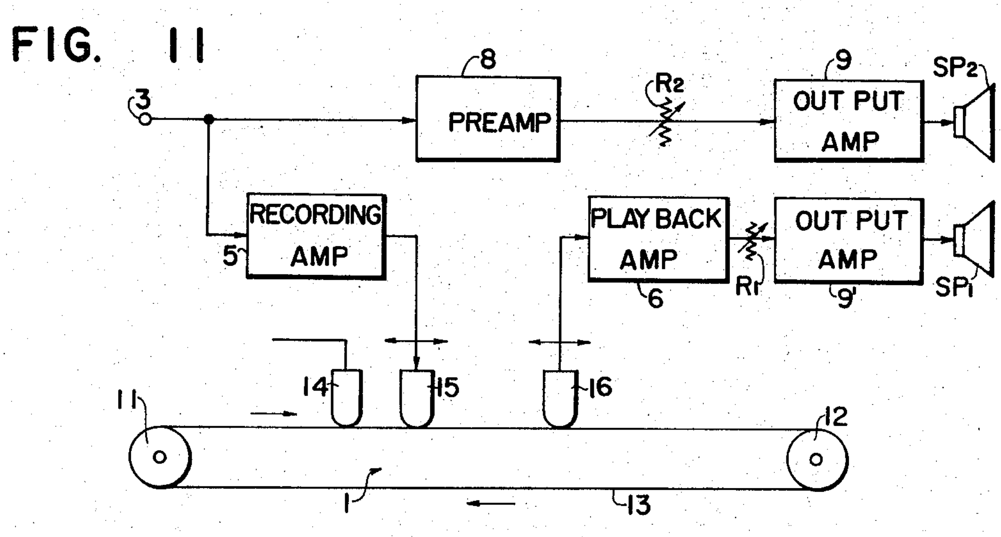
FIGS. 11 and 12 are views showing modifications of embodiments shown in FIGS. 8 and 9, respectively.
Figure 12:
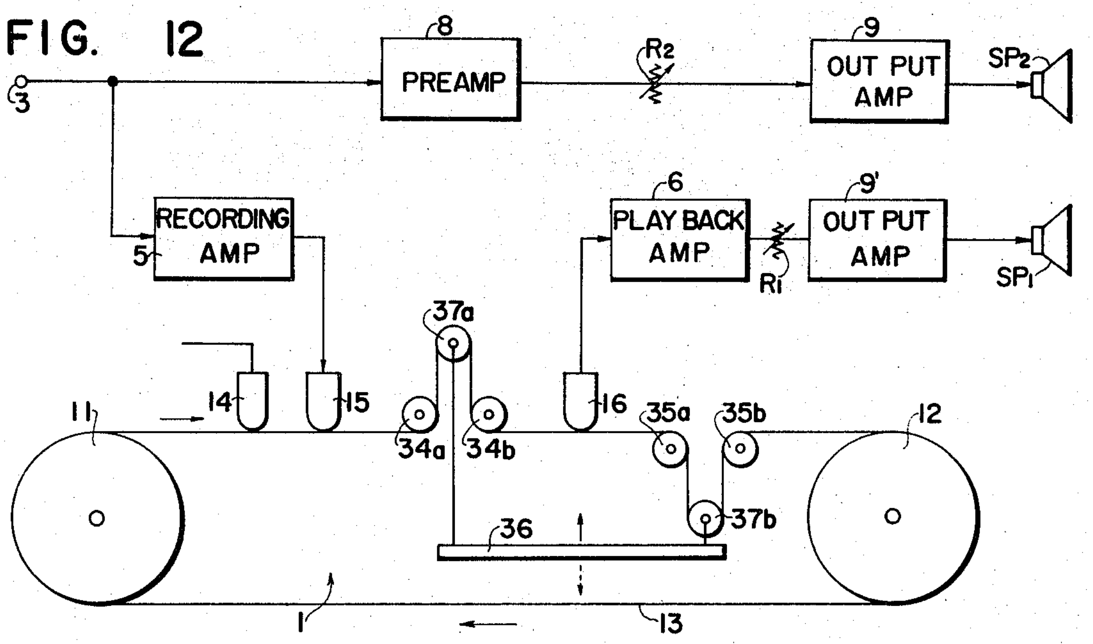

Referring to FIGS. 11 and 12, there are shown modifications of FIGS. 8 and 9, respectively, in which at the terminal 3 a pre-amplifier 8 is connected whose output is entered via a variable attenuator $R_2$ and an output amplifier 9 into a loudspeaker $SP_2$, while the output of the playback amplifier 6 is entered via another variable attenuator $R_1$ and an output amplifier $9_1$ into another loudspeaker $SP_1$. Each of these arrangements provides mixing, in space, of sounds having the spectrums as shown in FIGS. 4*a* and 4*b*, resulting in audible sounds having a good build-up amplitude.

Next, reference is made to a drive means for use in the above-mentioned vibrato effect producing apparatus with reference to FIGS. 13 to 16.

Figure 13:
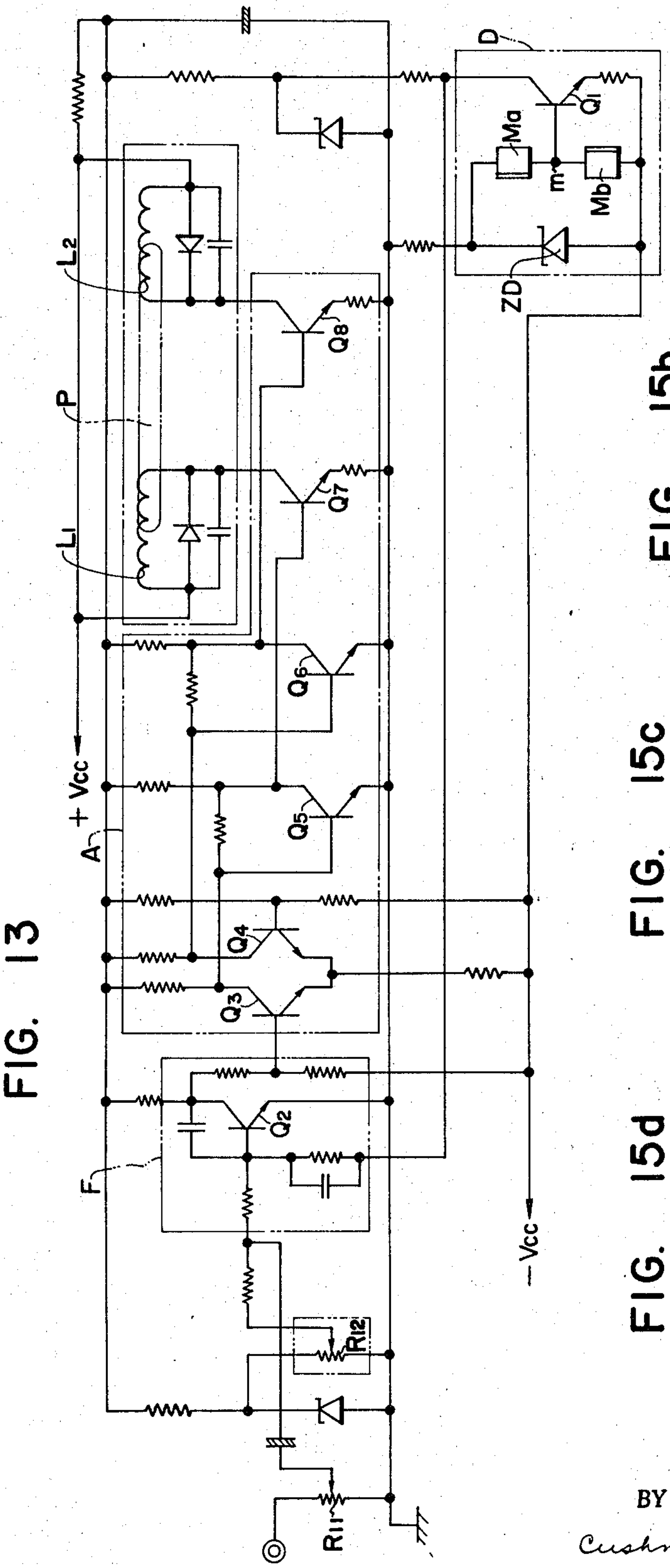
FIG. 13 is a schematic circuit diagram showing the details of FIG. 3.

FIG. 13 is a circuit diagram substantially showing the details of the block diagram of FIG. 3, in which blocks F, A and D correspond to reference numerals 23, 24 and 27, respectively; and symbols P, $R_{11}$, $R_{12}$, $L_1$, $L_2$ correspond to numerals 26, 22, 29, 25*a* and 25*b*.

Figure 14:
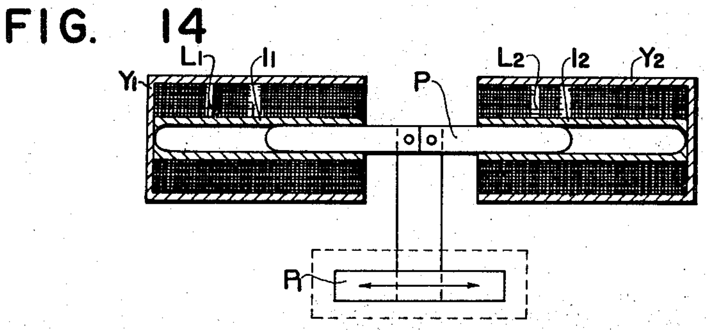
FIGS. 14 and 15*a* are schematic views showing a drive assembly shown in FIG. 3 and an example of a position detecting means, respectively.

FIG. 14 shows a structure of an electromagnetic piston-actuating means represented by a block including P, in which $Y_1$ and $Y_2$ are yokes by which plunger coils $L_1$ and $L_2$ are arranged opposite to each other, and $l_1$ and $l_2$ are guide tubes allowing a linear and reciprocal displacement of the piston. The piston is provided with a protruding movable piece $P_1$ on which may be mounted a position pick-up element such as a magnetic head.

Figure 15A:
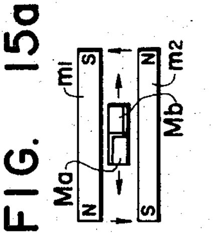

In FIG. 15*a*, there is shown an example of the piston position detecting device D or 27, in which $m_1$ and $m_2$ are magnet pieces opposing each other with the reverse relation in polarity, between which there are arranged magneto-sensitive elements Ma and Mb — whose electrical resistances vary in accordance with the variation in the ambient magnetic field — in response to the movement of the piston. As shown by block D in FIG. 13, the elements Ma and Mb are connected in series, both of the other ends of which are connected to a zener diode ZD. When a predetermined voltage is supplied across the diode from a power source +Vcc, respective voltages across the elements Ma and Mb are varied in response to the displacement of the piston. The voltage variation thus obtained is amplified by a transistor $Q_1$ and then used as a control signal for the motion of the piston.

Figure 15B:
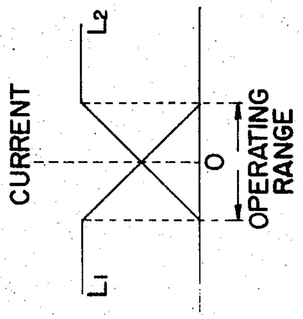
FIGS. 15*b* to 15*d* are charts for explaining the operation of the embodiment shown in FIGS. 3 and 13 to 15*a;*
Figure 15C:
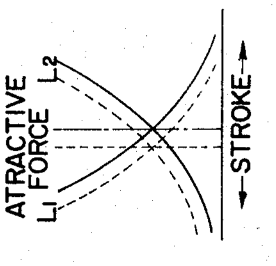

FIG. 15*b* shows a condition of current flowing into the plunger coils $L_1$ and $L_2$ in the circuit arrangement of FIG. 13. Accordingly, coils $L_1$ and $L_2$ thus energized produce attractive forces as shown by solid curves in FIG. 15*c*. The dotted curves indicate the range in which fine adjustment may be made by varying the DC level at the base of transistor $Q_2$ of the comparator circuit F.

Figure 15D:
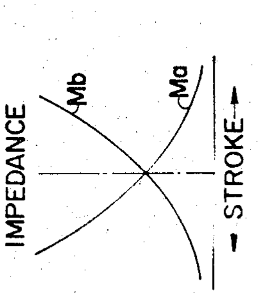

FIG. 15*d* indicates the relation of impedance variation of the elements Ma and Mb relative to the displacement of the piston.

Figure 16:
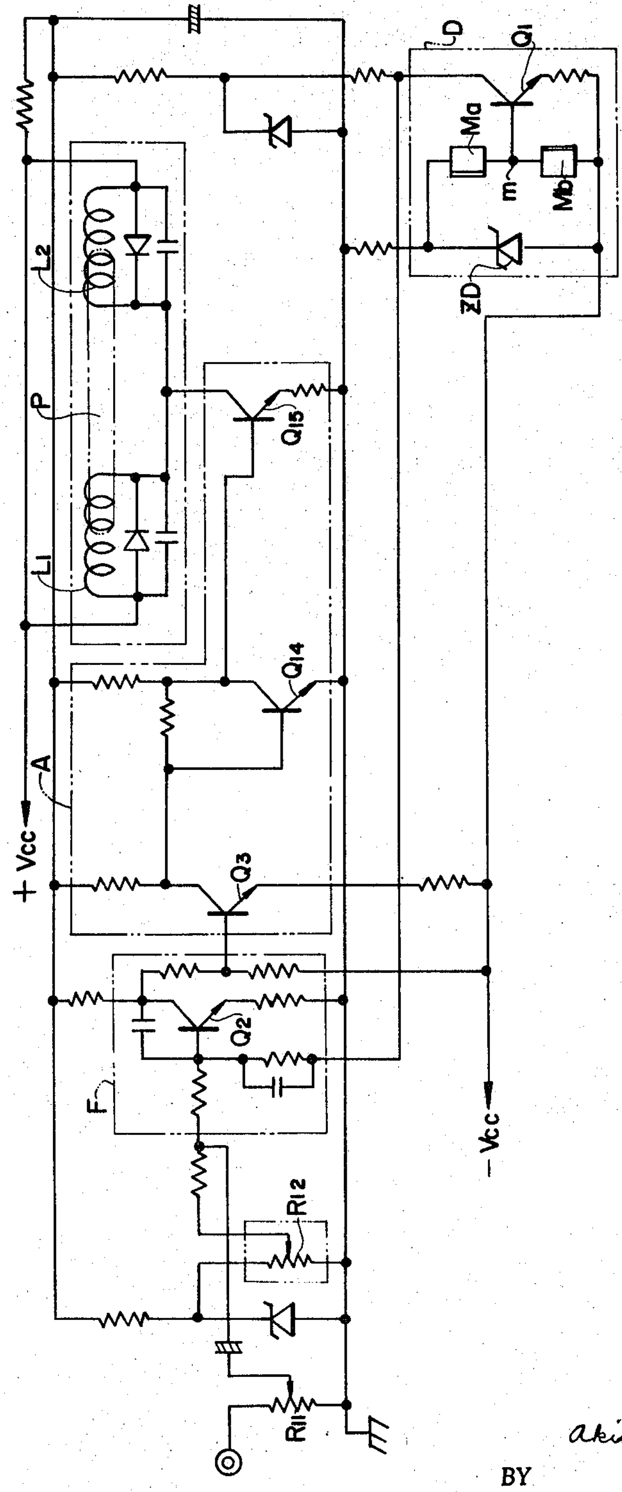
FIG. 16 is a circuit diagram showing a modification of FIG. 13.

FIG. 16 shows another circuit arrangement of the drive mechanism 2 — which is a modification of FIG. 13 — in which the plunger coils $L_1$ and $L_2$ are arranged to establish magnetic fields for actuating the piston P in the same direction or in the reverse direction.

I claim:

1. A vibrato effect producing apparatus comprising:
   means for receiving an input signal,
   a magnetic recording medium,
   a recording head connected to said input means for recording the input signal on said magnetic recording medium,
   a reproducing head for reproducing the recorded signal from said magnetic recording medium,
   means for moving said magnetic recording medium past said recording and reproducing heads,
   drive means for reciprocatingly displacing both said recording head and said reproducing head along the direction of movement of said recording medium at respectively low frequencies which are different from each other, and
   means connected to said reproducing head for deriving a frequency modulated signal therefrom.

2. An apparatus according to claim 1 further including a further drive means for reciprocatingly varying the length of that part of said recording medium which is running between said recording head and said reproducing head.

3. An apparatus according to claim 1, further comprising a feedback circuit for feeding said frequency modulated signal back to said input receiving means.

4. An apparatus according to claim 1, further comprising a mixing circuit for mixing said input signal and said frequency modulated signal.

5. An apparatus according to claim 1, further comprising acoustic means connected respectively to said input receiving means and said output means for converting said input signal and said frequency modulated signal into acoustic sounds.

6. An apparatus according to claim 1, in which said drive means is operated at an ultra low frequency in the order of 0.5 to 10 Hz.

* * * * *